Figure 1:
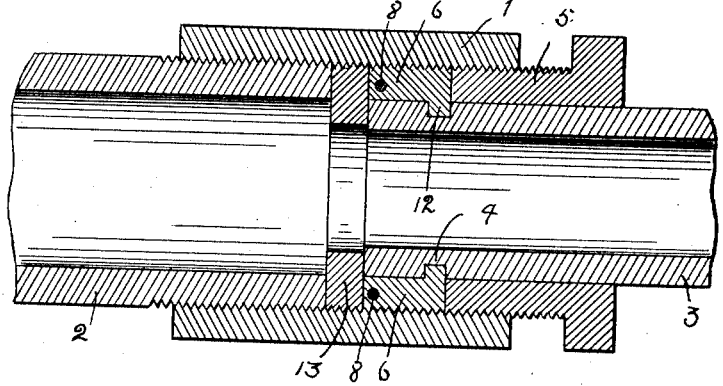

H. L. LIBERTY.
PIPE COUPLING.
APPLICATION FILED MAY 29, 1919.

1,334,306. Patented Mar. 23, 1920.

Inventor
Harry L. Liberty.
By Geo. Stevens,
Attorney

UNITED STATES PATENT OFFICE.

HARRY L. LIBERTY, OF DULUTH, MINNESOTA.

PIPE-COUPLING.

1,334,306.  Specification of Letters Patent.  Patented Mar. 23, 1920.

Application filed May 29, 1919. Serial No. 300,632.

*To all whom it may concern:*

Be it known that I, HARRY L. LIBERTY, a citizen of the United States, residing at Duluth, in the county of St. Louis and State of Minnesota, have invented certain new and useful Improvements in Pipe-Couplings, of which the following is a specification, reference being had therein to the accompanying drawing.

This invention relates to pipe couplings and has special reference to a coupling for gas and other like metal pipes.

The principal object is to produce a coupling that will permit of the ends of pipes being securely coupled without being threaded.

Another object is to produce a coupling of this character which will permit of pipes of different diameters being successfully coupled and wherein the end of one pipe may be threaded, or not, as desired.

Other objects and advantages of the peculiar construction will appear in the further description of the invention.

Figure 2:
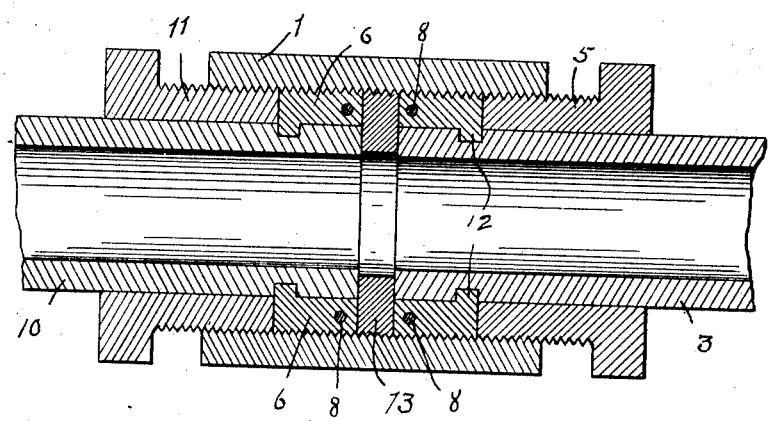
Figure 3:
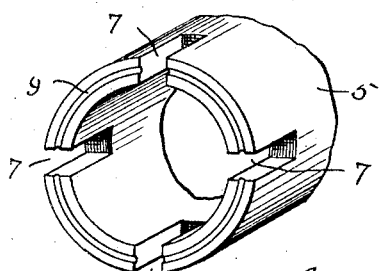
Figure 5:
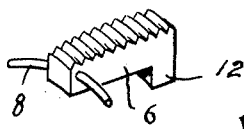
Figure 4:
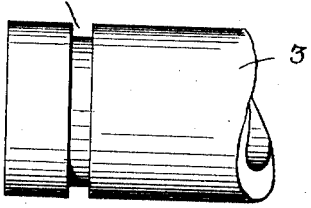

Referring to the accompanying drawings forming part of this application and in which like reference characters indicate like parts:

Figure 1 is a central vertical sectional view through one of my improved couplers uniting the ends of two pipes of different diameter, the larger one being threaded and the smaller one not, Fig. 2 is a similar view of two pipes of like diameter being coupled and not threaded, Fig. 3 is a perspective view of the end of one of the threaded bushings employed in the novel coupling, Fig. 4 is a perspective view of one of the dogs employed in the coupling, and Fig. 5 is an elevation of one end of one of the pipes as it appears prepared for application of the coupling.

1 represents a common internally threaded plain coupling which is usually screw-threadedly attached to the abutting ends of two pieces of pipe and in Fig. 1, I have illustrated one such piece of pipe, at 2, being inserted within the coupling 1 in the usual manner. At 3 is shown the end of a piece of pipe of smaller diameter previously prepared for application of the coupling by having formed an annular rectangular-shaped groove 4 spaced inwardly from the extreme end thereof, this being the only essential preparation of the pipe for application to the coupling.

About the end of the pipe 3 and intermediate of it and the coupling 1 is inserted the externally screw-threaded gland 5, carrying within its inner end the, preferably, four diametrically opposed dogs 6, they being mounted within suitable slots 7 formed in the end of the gland and the outer surfaces of the dogs are screw-threaded to correspond to that portion of the gland of which they form a part. These dogs are held in position within their respective slots by having holes formed through the ends thereof, into which the spring wire ring 8 is threaded, said ring registering with and engageable in the annular groove 9 formed in the end of the gland which temporarily holds the dogs in place when not surrounded by the union or coupling 1.

In Fig. 2, 10 represents a piece of pipe, similar in all respects to the pipe 3, and held in place within the union 1 by the gland 11 and dogs 6.

Intermediate of the adjacent ends of the pipes, either 2 and 3 or 3 and 10, is installed a suitable washer 13 of rubber or soft metal, as the case may require, for insuring a tight joint between the ends of the pipes and this washer may be either screw-threaded within the coupling 1 or may be made to slip in loosely, as preferred.

It is apparent that by this construction, when the glands are slipped over the ends of the pipes previously prepared with the groove 4 therein for their reception, the catches 12 on the ends of the dogs 6 will become engaged within said groove and any subsequent longitudinal movement of the glands will carry the pipe with them. When the glands are then inserted within the coupling 1 by being screw-threaded therein, the dogs will be firmly held in place and the two ends of the pipes being coupled may be forced to any desired degree against the intermediate washer to form a tight joint between the ends of the pipe.

From the foregoing it is evident that I have devised a simple form of coupling and while I have shown a specific form of construction, it is to be understood that modifications within the scope of the claims may be resorted to without departing from the spirit thereof.

Having thus described my invention, what

I claim as new and desire to secure by Letters Patent, is:

1. In a pipe coupling the combination with an internally screw-threaded portion, of an externally screw-threaded gland carrying a plurality of pivotally supported dogs upon the end thereof insertible within the internally screw-threaded portion, and a pipe having an annular groove formed in the circumferential surface thereof, adjacent the extreme end and coöperatively engaged by the dogs.

2. A pipe coupling comprising an internally screw-threaded central portion, externally screw-threaded glands insertible within the central portion from both ends thereof, a plurality of pivotally supported dogs carried within the end of each gland which is insertible within the central portion, a pipe within each gland having an external annular recess therein engaged by the dogs and a packing washer intermediate of the ends of the pipes, substantially as described.

3. In a pipe coupling of the character described, the combination with encircling outer holding members and screw-threaded glands insertible within opposite ends of the outer member, of dogs pivotally mounted within the walls of the innermost ends of the glands and pipes insertible within the glands having annular recesses in the outer circumferential faces thereof, coöperatively engaged by the dogs, whereby, when the glands are moved either back or forth within the encircling member, the pipes are correspondingly moved.

In testimony whereof I have hereunto affixed my signature in the presence of two witnesses:

HARRY L. LIBERTY.

Witnesses:
S. GEO. STEVENS,
C. M. OUELLETTE.